(12) United States Patent
Chu (10) Patent No.: US 7,532,233 B2
(45) Date of Patent: May 12, 2009

(54) VEHICLE MONITORING APPARATUS

(76) Inventor: Fu Lai Chu, No. 26, Lane 1921, Ginguo Road, Dagia Town, Taichung Hsien 43768 (TW)

(*) Notice: Subject to any disclaimer, the term of this patent is extended or adjusted under 35 U.S.C. 154(b) by 699 days.

(21) Appl. No.: 11/200,938

(22) Filed: Aug. 10, 2005

(65) Prior Publication Data

US 2006/0232389 A1     Oct. 19, 2006

Related U.S. Application Data

(63) Continuation-in-part of application No. 10/968,557, filed on Oct. 19, 2004.

(51) Int. Cl.
*H04N 9/47*     (2006.01)
*H04N 5/225*     (2006.01)

(52) U.S. Cl. .................... 348/148; 348/118; 348/373

(58) Field of Classification Search .............. 348/118, 348/151, 173, 208.7, 36, 375, 373, 148
See application file for complete search history.

(56) References Cited

U.S. PATENT DOCUMENTS

| 4,277,804 | A | * | 7/1981 | Robison | 348/148 |
| 5,574,443 | A |   | 11/1996 | Hsieh | 340/901 |
| 5,631,638 | A |   | 5/1997 | Kaspar et al. | 340/902 |
| 6,147,701 | A | * | 11/2000 | Tamura et al. | 348/36 |
| 6,175,300 | B1 | * | 1/2001 | Kendrick | 340/436 |
| 6,554,210 | B2 | * | 4/2003 | Holt et al. | 239/284.2 |
| 6,674,476 | B1 | * | 1/2004 | Suzuki | 348/375 |

\* cited by examiner

*Primary Examiner*—Nhan T Tran
*Assistant Examiner*—Mekonnen Dagnew (57) ABSTRACT

A vehicle monitoring device includes an image taking device for attaching to a vehicle, such as a four-wheeled vehicle, a tricycle, a motorcycle, a bicycle or other two-wheeled vehicles, and having a motor attached to the vehicle, and a follower attached to the motor for being rotated by the motor. A video camera is attached to the follower, and rotated in concert with the follower. Another motor is disposed in the follower and coupled to the video camera, for rotating and adjusting the video camera relative to the follower to different angular directions. A wiper may be attached to the housing, for wiping and cleaning a cap of the housing.

7 Claims, 7 Drawing Sheets

VEHICLE MONITORING APPARATUS

The present invention is a continuation-in-part of U.S. patent application Ser. No. 10/968,557, filed on 19 Oct. 2004, pending.

BACKGROUND OF THE INVENTION

1. Field of the Invention

The present invention relates to a vehicle monitoring apparatus, and more particularly to a vehicle monitoring apparatus for attaching to various vehicles, such as four-wheeled vehicles, tricycles, motorcycles, bicycles, or other two-wheeled vehicles, etc., and having image taking devices or video cameras adjustable to different directions for broadening the rearward viewing for the vehicle drivers or riders.

2. Description of the Prior Art

Typical vehicles may comprise a display device provided in a rearview mirror of the vehicle, for showing or displaying various information for the drivers of the vehicles, such as inside temperature in the vehicle, the humidity in the vehicle, the air pressure, the pollution content within the vehicle, the light intensity outside the vehicle, the map of the environment, etc.

For example, U.S. Pat. No. 5,631,638 to Kaspar et al. discloses a typical information system in a motor vehicle, including one or more electric circuits connected to a vehicle computer of the motor vehicle and one or more sensors, and a display device for displaying information for drivers. However, the typical information system may not be used to show or to view or to see the objects or views behind the vehicles.

The other typical vehicle monitoring apparatuses have been developed and comprise three or more image taking devices or video cameras attached to two front side portions and a rear portion of vehicles, for taking images or views behind the vehicles, and for allowing the drivers to clearly see the objects or views behind the vehicles.

For example, U.S. Pat. No. 5,574,443 to Hsieh discloses one of the typical vehicle monitoring apparatuses comprising a display device coupled to three or more video cameras, for taking images or views behind the two side portions and the rear portion of the vehicles, and for allowing the drivers to clearly see the objects or views behind the vehicles via the display device.

However, the video cameras are solidly fixed to the vehicles, and may not be adjusted relative to the vehicles to different angular directions, such the rearward viewing of the vehicles is limited and may not be directed or adjusted to different viewing directions.

The present invention has arisen to mitigate and/or obviate the afore-described disadvantages of the conventional vehicle monitoring apparatuses.

SUMMARY OF THE INVENTION

The primary objective of the present invention is to provide a vehicle monitoring apparatus for attaching to various vehicles, such as four-wheeled vehicles, tricycles, motorcycles, bicycles, or other two-wheeled vehicles, etc., and including one or more image taking devices or video cameras adjustable to different directions for broadening rearward viewing, and for allowing users to reliably and safely view toward various directions behind the vehicles.

In accordance with one aspect of the invention, there is provided a vehicle monitoring apparatus for attaching to a rear portion of a wheeled vehicle, comprising an image taking device including a first motor for attaching to the rear portion of the wheeled vehicle, and including a spindle extended therefrom, a follower attached to the spindle of the first motor, and arranged to be rotated and driven by the first motor, a video camera rotatably attached to the follower, and rotated in concert with the follower, and a second motor attached to the follower and coupled to the video camera, to rotate and adjust the video camera relative to the follower to different angular directions.

The follower includes an orifice formed therein for receiving the spindle of the first motor. The follower includes a non-circular portion formed in the orifice thereof, and the spindle of the first motor includes a non-circular end portion received in the non-circular portion of the follower, to prevent the follower from being rotated relative to the spindle of the first motor.

The follower includes a socket formed therein, the video camera includes a pivot member attached thereto, and rotatably received in the socket of the follower, to allow the video camera to be rotated and adjusted relative to the follower.

The video camera includes a rack attached thereto and having a plurality of teeth provided thereon, the second motor includes a pinion attached thereto and engaged with the teeth of the rack, to rotate and adjust the rack and thus the video camera relative to the follower. The rack includes a recess formed therein for stably receiving and anchoring the video camera therein.

The image taking device includes a control device coupled to the video camera, to control and operate the video camera. The control device includes at least one display device coupled to the video camera, to display images taken by the video camera.

A housing may further be provided for attaching to the rear portion of the wheeled vehicle, and includes an opening formed therein, and a cap engaged in the opening of the housing, to enclose the opening of the housing, and to prevent dirt or particles from entering into the housing.

The image taking device includes a wiper attached to the housing, for wiping and cleaning the cap. The image taking device may further include at least one water supplying nozzle attached to the housing, for supplying water to clean the cap. The image taking device may further include at least one air supplying nozzle attached to the housing, for supplying air to clean the cap.

The image taking device includes a base for attaching to the rear portion of the wheeled vehicle, and the base includes a space formed therein for receiving the first motor therein.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
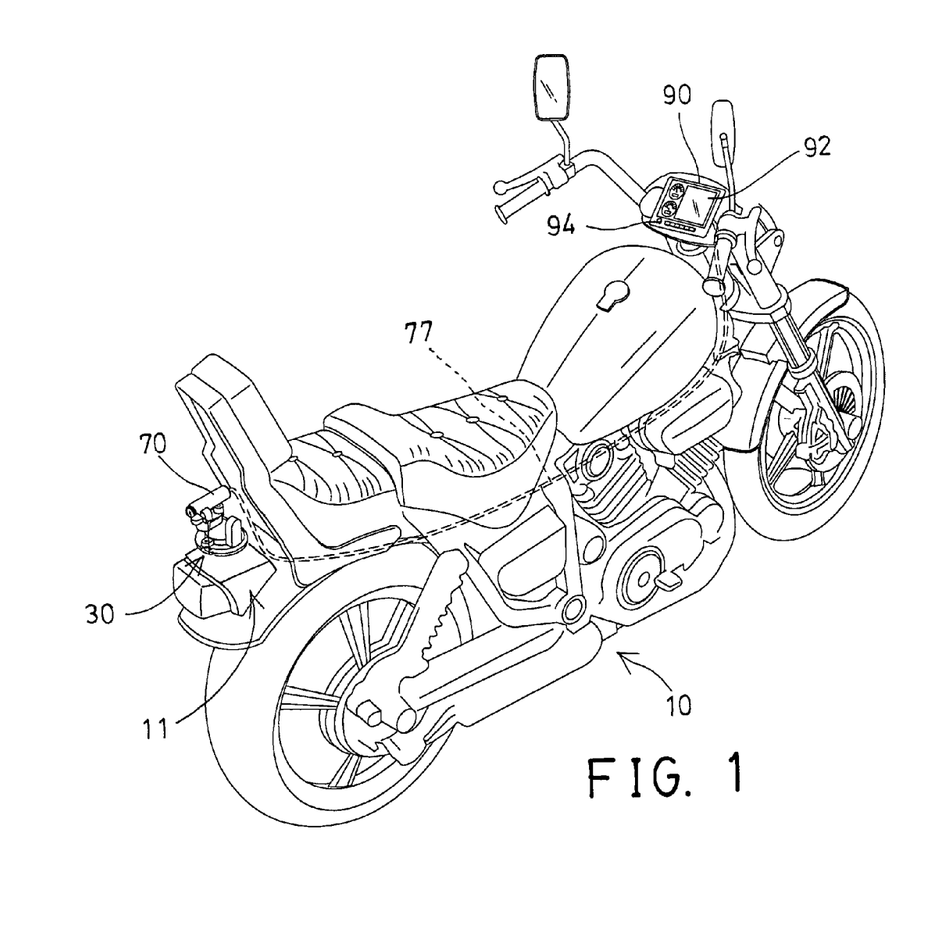
FIG. 1 is a rear perspective view of a wheeled vehicle in accordance with the present invention including a monitoring apparatus having one or more image taking devices or video cameras adjustable to different directions.
Figure 2:
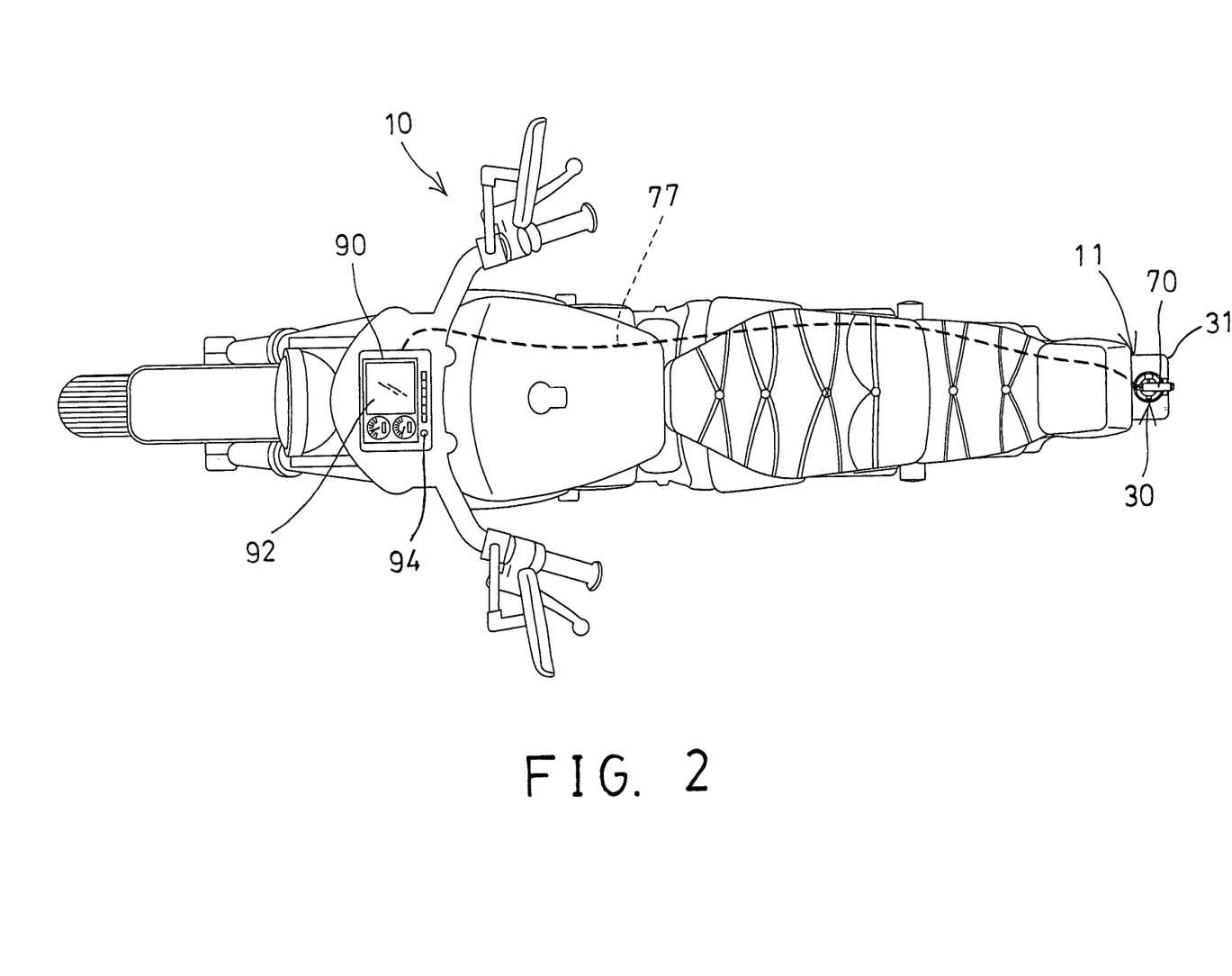
FIG. 2 is a top elevational view of the wheeled vehicle.
Figure 3:
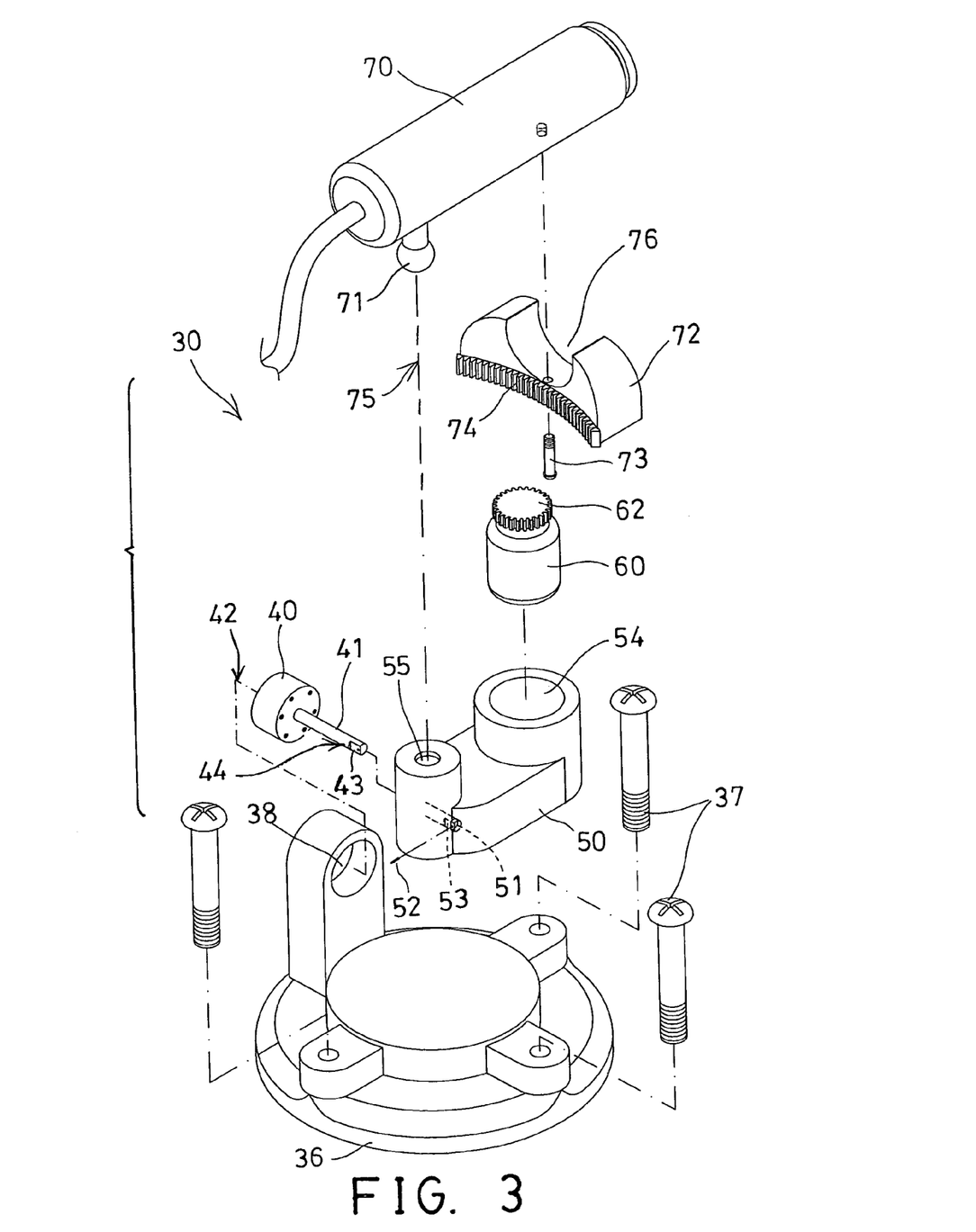
FIG. 3 is a partial exploded view illustrating one of the image taking devices of the vehicle monitoring apparatus in accordance with the present invention.
Figures 9, 10:
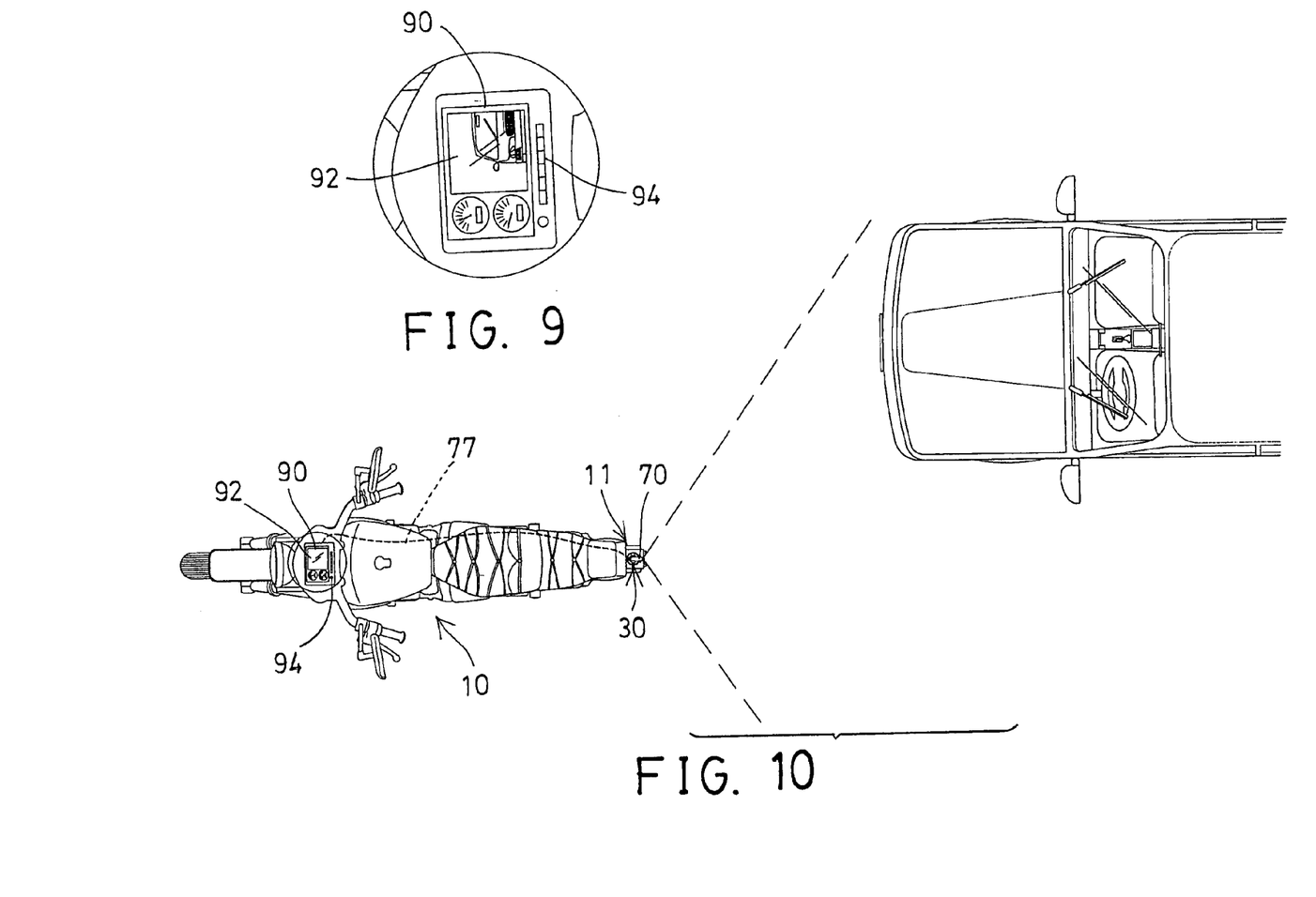
FIG. 9 is a partial top elevational view illustrating a control panel of the vehicle.
FIG. 10 is a top elevational view similar to FIG. 2, illustrating the operation of the image taking device of the vehicle monitoring apparatus.
Figure 11:
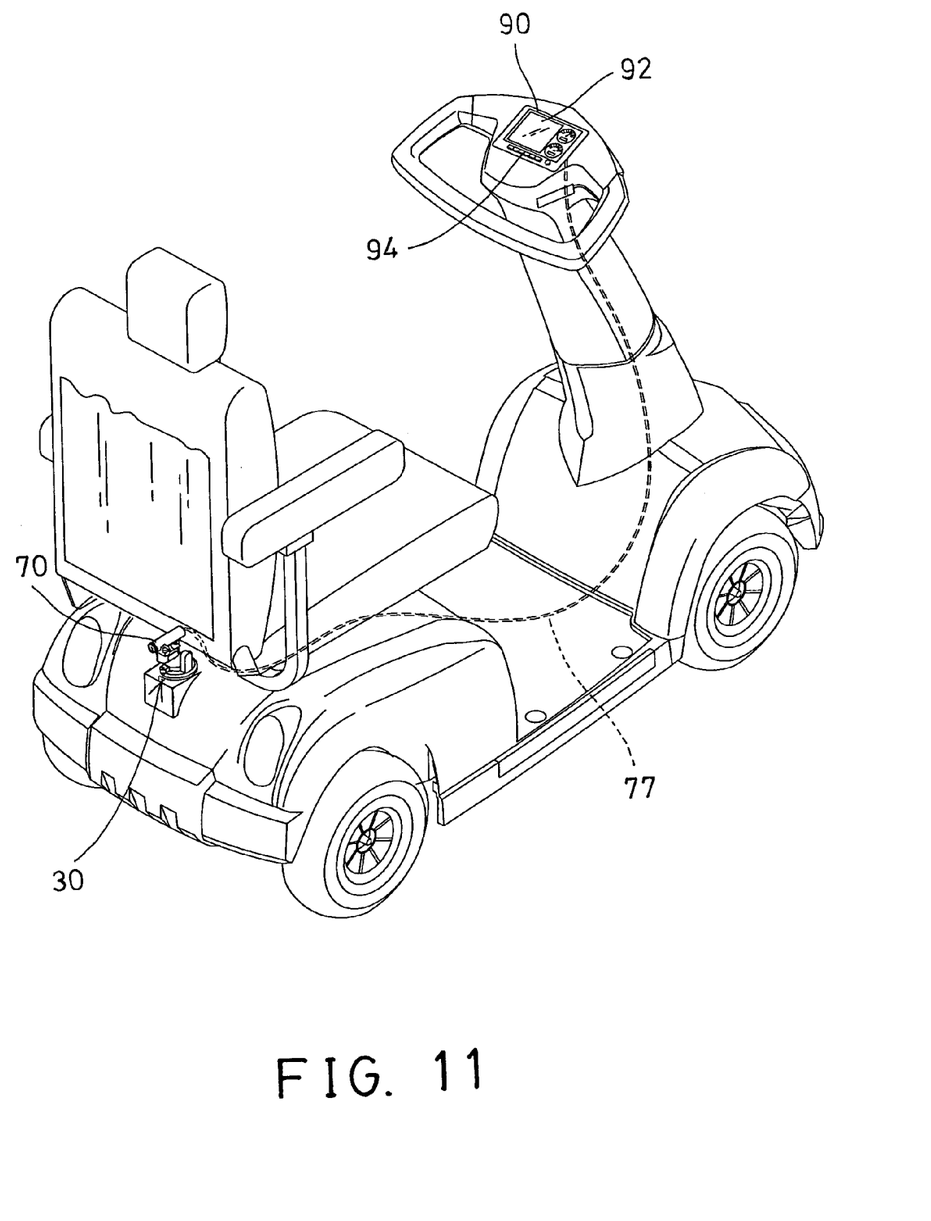
FIG. 11 is a rear perspective view similar to FIG. 1, illustrating the other arrangement of the vehicle monitoring apparatus for attaching to the other vehicle.

Referring to the drawings, and initially to FIGS. 1 and 2, a vehicle monitoring apparatus in accordance with the present invention comprises one or more image taking devices 30 for attaching to a rear portion 11 of a vehicle 10, such as a four-wheeled vehicle as shown in FIG. 11 or as disclosed in the co-pending U.S. patent application Ser. No. 10/968,557, filed on 19 Oct. 2004, which may be taken as a reference for the present invention, a tricycle (not shown), a motorcycle (FIGS. 1, 2 and 10), a bicycle (not shown), or other two-wheeled vehicles, etc., for taking pictures or for viewing the side portions and the rear portion of the vehicle 10.

Figure 8:
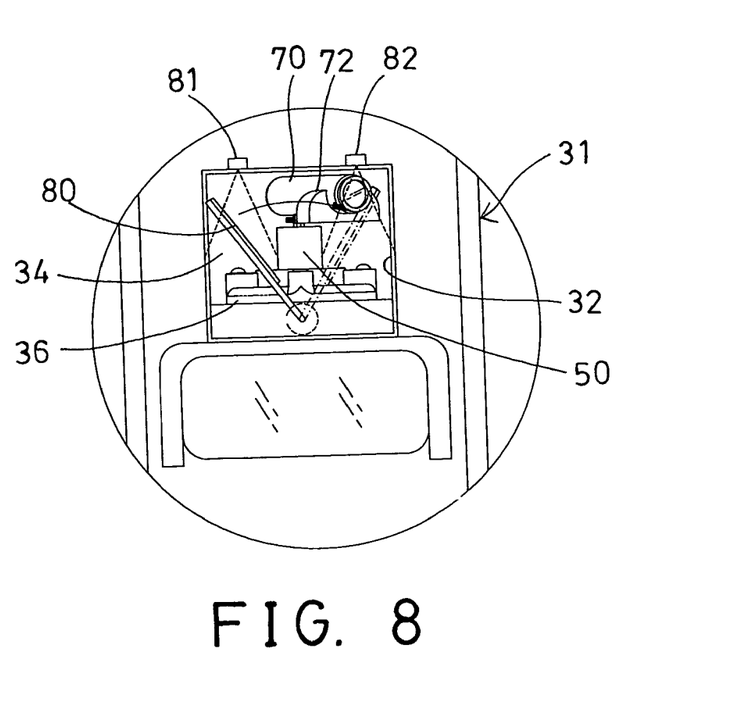
FIG. 8 is a partial rear plan view illustrating a cleaning device for the vehicle monitoring apparatus.

The image taking devices 30 includes such as a housing 31 (FIGS. 2, 8) for securing to the rear portion 11 of the vehicle 10 with such as fasteners (not shown), and the housing 31 includes a rear opening 32 having a glass or transparent or semi-transparent cap 34 engaged in or attached to the rear opening 32 thereof, best shown in FIG. 8, for enclosing the housing 31, and for preventing dirt or particles or other objects from entering into the housing 31, and for protecting the image taking device 30.

As shown in FIGS. 3-8, each of the image taking devices 30 includes a base 36 disposed in the housing 31, or directly attached or secured to the rear portion 11 of the vehicle 10 with such as fasteners 37, and having a space 38 formed therein (FIGS. 3-4 and 6) for receiving a motor 40 therein. The motor 40 includes a spindle 41 extended therefrom and having a longitudinal axis 42, and having a cut off portion 43 formed in the free end portion 44 thereof (FIG. 3), to form or define one or more flat surfaces therein, or to form a non-circular free end portion 44 for the spindle 41.

A follower 50 includes an orifice 51 formed therein (FIGS. 3, 6), for receiving the spindle 41 of the motor 40, which may be secured to the follower 50 with such as lock pins or fasteners 52, latches (not shown), or the like. It is preferable that the follower 50 also includes a corresponding non-circular portion 53 formed in the orifice 51 thereof (FIG. 3), for receiving the corresponding non-circular free end portion 44 of the spindle 41.

Figure 4:
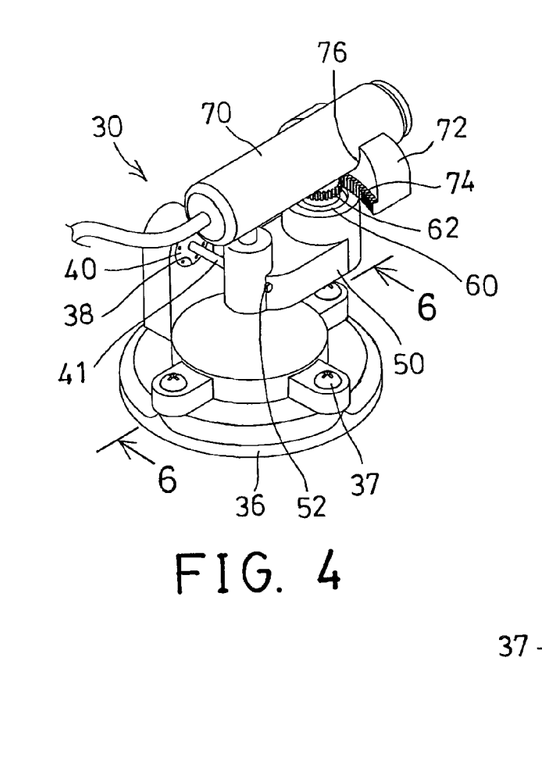
FIG. 4 is an enlarged partial perspective view of the image taking device.
Figure 5:
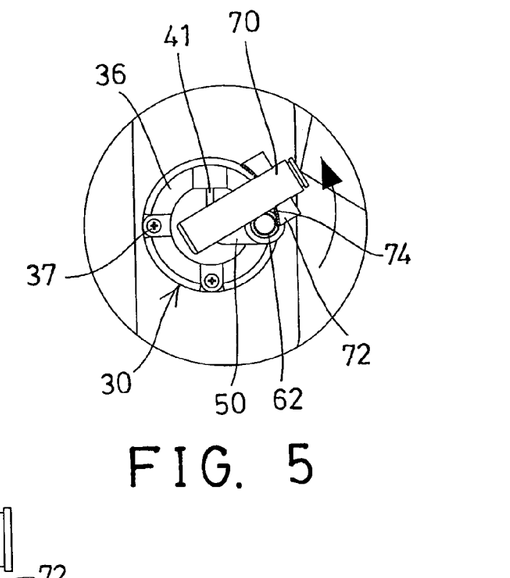
FIG. 5 is a top elevational view illustrating the operation of the image taking device of the vehicle monitoring apparatus.

For example, as shown in FIG. 4, the non-circular free end portion 44 of the spindle 41 may be engaged out through the corresponding non-circular portion 53 of the orifice 51 of the follower 50, and then locked or secured to the follower 50 with the lock pins or fasteners 52, to prevent the follower 50 from being rotated relative to the spindle 41 of the motor 40, and thus to allow the follower 50 to be rotated or driven by the motor 40.

The follower 50 further includes a compartment 54 formed therein (FIGS. 3, 6), for receiving another motor 60, which includes a spindle 61 (FIG. 6) offset or spaced away from the spindle 41 of the motor 40, and inclined or perpendicular to the spindle 41 of the motor 40. The motor 60 further includes a pinion 62 secured to the spindle 61 thereof and rotated in concert with the spindle 61 thereof. The follower 50 further includes a socket 55 formed therein.

A video camera 70, such as a charge couple device (CCD) 70 includes a pivot member 71 attached to a rear portion thereof, and rotatably received in the socket 55 of the follower 50, to allow the video camera 70 to be rotated or adjusted relative to the follower 50 about a rotating axis 75 that is perpendicular to the longitudinal axis 42 of the spindle 41 of the motor 40, and includes a rack 72 secured to the front portion thereof with such as fasteners 73, and having a number of teeth 74 provided therein, for engaging with the pinion 62, and thus for allowing the video camera 70 to be rotated or adjusted relative to the follower 50 by the motor 60, toward different angular directions. It is preferable that the rack 72 includes a recess 76 formed therein (FIGS. 3-4) for stably receiving and anchoring the video camera 70 therein.

Figure 6:
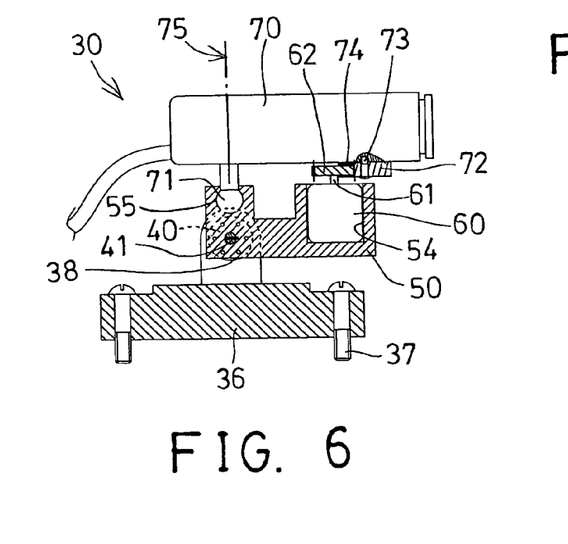
FIG. 6 is a partial cross sectional view taken along lines 6-6 of FIG. 4.
Figure 7:
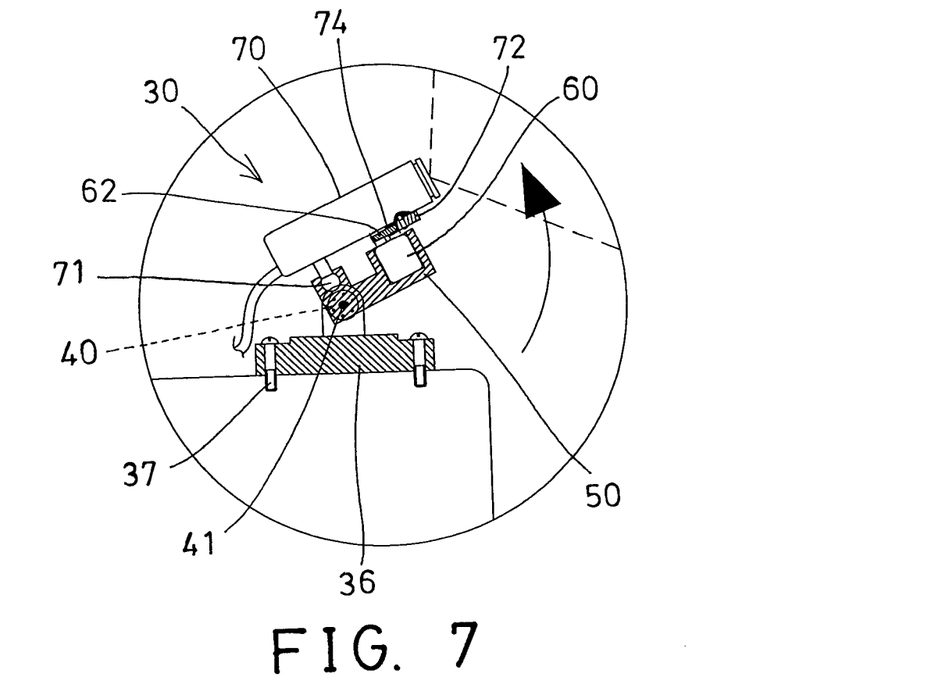
FIG. 7 is a partial cross sectional view similar to FIG. 6, illustrating the operation of the image taking device of the vehicle monitoring apparatus.

In operation, as shown in FIGS. 4 and 6-7, the follower 50 and the video camera 70 may be rotated or driven or adjusted by the motor 40 around the longitudinal axis 42 of the spindle 41 of the motor 40, toward different elevational and angular positions. In addition, the video camera 70 may also be the rotated or driven or adjusted by the motor 60 around the rotating axis 75 of the video 10 camera 70 (FIG. 5) toward different horizontal and angular positions, to allow the video camera 70 to be rotated or adjusted toward different angular directions relative to the follower 50 and the base 36 by the motors 40, 60, and thus to allow the video camera 70 to clearly take pictures or to suitably view the side portions and the rear portion of the vehicle 10.

As shown in FIG. 8, the image taking device 30 includes a wiper 80 attached to the front portion thereof, for wiping the cap 34, and for allowing the video camera 70 to more clearly take pictures or to suitably view the side portions and the rear portion of the vehicle 10. One or more water supplying nozzles 81 and one or more air supplying nozzles 82 may also be attached to the front portion of the image taking devices 30, for supplying water and/or air to clean the cap 34.

As shown in FIGS. 1-3 and 13-14, the vehicle monitoring apparatus further includes a control device 90 disposed such as in front of the vehicle 10, and coupled to the video cameras 70 and/or the motors 40, 60 of the image taking devices 30 with such as electric wires or cables 77, for controlling or operating the video cameras 70 and/or the motors 40, 60 of the image taking devices 30. The control device 90 includes one or more screens or display devices 92 provided thereon, and coupled to the video cameras 70 respectively, for displaying the images or pictures taken by the video cameras 70 respectively, and thus for allowing the users to easily see or view the side portions and the rear portion of the vehicle 10.

As shown in FIGS. 1-2 and 10-11, the control device 90 of the vehicle monitoring apparatus may further include one or more switch buttons 94 provided therein, for such as controlling or operating the motors 40, 60 of the image taking devices 30 to rotate or to adjust the video cameras 70 toward different angular directions relative to the follower 50 and the base 36, and thus to allow the video camera 70 to clearly take pictures or to suitably view the side portions and the rear portion of the vehicle 10.

Accordingly, the vehicle monitoring apparatus in accordance with the present invention includes one or more image taking devices or video cameras adjustable to different directions for broadening rearward viewing, and for allowing users to reliably and safely view toward various directions behind the vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vehicle monitoring apparatus for attaching to a rear portion of a wheeled vehicle, comprising:
    an image taking device including a base for attaching to the rear portion of a wheeled vehicle, said base having a space laterally formed therein, a first motor received in said space of said base said first motor having a spindle longitudinally extended therefrom, said spindle having a non-circular end portion,
    a follower attached to said spindle of said first motor, and arranged to be rotated and driven by said first motor, said follower having an orifice laterally formed therein for receiving said spindle of said first motor, said follower having a non-circular portion formed in said orifice thereof for receiving said non-circular portion of said spindle to prevent said follower from being rotated relative to said spindle of said first motor, said follower having a socket and a compartment respectively formed in a top thereof,
    a video camera rotatably attached to said follower, and rotated in concert with said follower, said video camera having a pivot member attached thereto, said pivot member rotatably received in said socket of said follower for allowing said video camera to be rotated and adjusted relative to said follower, said video camera having a rack attached therto, said rack having a plurality of teeth formed thereon, said rack having a recess defined there in for stably receiving and anchoring said video camera therein, and
    a second motor received in said compartment of said follower, said second motor having a spindle longitudinally extending therefrom, said spindle of said second motor being perpendicular to said spindle of said first motor, said second motor having a pinion attached to said spindle thereof, said pinion engaged with said teeth of said rack to rotate and adjust said rack for rotating and adjusting said video camera relative to said follower to different angular directions.

2. The vehicle monitoring apparatus as claimed in claim 1, wherein said image taking device includes a control device coupled to said video camera, to control and operate said video camera.

3. The vehicle monitoring apparatus as claimed in claim 2, wherein said control device includes at least one display device coupled to said video camera, to display images taken by said video camera.

4. The vehicle monitoring apparatus as claimed in claim 1 further comprising a housing for attaching to the rear portion of the wheeled vehicle, and including an opening formed therein, and a cap engaged in said opening of said housing, to enclose said opening of said housing, and to prevent dirt or particles from entering into said housing.

5. The vehicle monitoring apparatus as claimed in claim 4, wherein said image taking device includes a wiper attached to said housing, for wiping and cleaning said cap.

6. The vehicle monitoring apparatus as claimed in claim 4, wherein said image taking device includes at least one water supplying nozzle attached to said housing, for supplying water to clean said cap.

7. The vehicle monitoring apparatus as claimed in claim 4, wherein said image taking device includes at least one air supplying nozzle attached to said housing, for supplying air to clean said cap.

* * * * *